(12) United States Patent
Shelby et al.

(10) Patent No.: US 6,599,994 B2
(45) Date of Patent: Jul. 29, 2003

(54) POLYESTER BLENDS AND HEAT SHRINKABLE FILMS MADE THEREFROM

(75) Inventors: Marcus David Shelby, Kingsport, TN (US); Candace Michele Tanner, Kingsport, TN (US); Kevin Douglas Horton, Surgoinsville, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/908,201

(22) Filed: Jul. 18, 2001

(65) Prior Publication Data

US 2003/0088033 A1 May 8, 2003

(51) Int. Cl.$^7$ .............................................. C08L 67/02
(52) U.S. Cl. ...................... 525/444; 525/448; 428/34.9; 428/35.1; 428/910
(58) Field of Search ................................ 525/444, 448; 428/34.9, 35.1, 910

(56) References Cited

U.S. PATENT DOCUMENTS

| | | | |
|---|---|---|---|
| 2,623,031 A | 12/1952 | Dagenkolb | |
| 3,187,075 A | 6/1965 | Seifried et al. | |
| 4,362,775 A | * 12/1982 | Yabe | 428/213 |
| 4,814,426 A | 3/1989 | Utsumi et al. | |
| 4,963,418 A | 10/1990 | Isaka et al. | |
| 4,996,291 A | 2/1991 | Yoshinaka et al. | |
| 5,446,079 A | 8/1995 | Buchanan et al. | |
| 5,580,911 A | 12/1996 | Buchanan et al. | |
| 5,599,858 A | 2/1997 | Buchanan et al. | |
| 5,859,116 A | 1/1999 | Shih | |
| 5,900,322 A | 5/1999 | Buchanan et al. | |

FOREIGN PATENT DOCUMENTS

| | | |
|---|---|---|
| EP | 0854175 A2 | 7/1998 |
| EP | 0905191 A1 | 3/1999 |
| EP | 0934813 A2 | 11/1999 |

* cited by examiner

Primary Examiner—Patricia A. Short
(74) Attorney, Agent, or Firm—Eric D. Middlemas; Bernard J. Graves, Jr.

(57) ABSTRACT

A compositional blend of from about 50 to about 99 weight percent of a polyester and from about 1 to about 50 weight percent of an essentially, linear, random aliphatic-aromatic copolyester or branched and/or chain extended copolyester thereof is useful as a heat-shrinkable film.

24 Claims, 4 Drawing Sheets

POLYESTER BLENDS AND HEAT SHRINKABLE FILMS MADE THEREFROM

BACKGROUND OF THE INVENTION

1. Field of the Invention

This invention relates to polymer compounds and articles made from the compounds. More particularly, this invention relates to specific polyester blends useful in making heat-shrinkable films.

2. Background of the Invention

Heat-shrinkable or thermo-shrinkable films are well known and have found commercial acceptance in a variety of applications. Generally, at a given temperature, and particularly above the glass transition temperature (Tg), a thermoplastic film material will extend if subjected to tensile stress. If the extension is maintained while the temperature is sufficiently lowered below the glass transition temperature, a state of increased internal stress is set. However, the stress is relieved and the film contracts, i.e., shrinks, when the film is again heated to near the glass transition temperature or higher. If the plastic films are set by cooling after stretching in two directions, which are at right angles to each other, the film is capable of shrinking in both directions, i.e., biaxially stretched heat-shrinkable film is produced.

Heat-shrinkable plastic films are used as coverings, to hold objects together, and as an outer wrapping and labels for bottles, cans and other kinds of containers. For example, such films are used for covering the cap, neck, shoulder or bulge of bottles or for the entire bottles; for the purpose of labeling, tamper-evident protection, parceling, or increasing the value of the product; and for other reasons. In addition, such films may be used as a covering to package such objects as boxes, bottles, boards, rods, or notebooks together in groups, and such films may also be attached closely as a wrapping. The uses mentioned above take advantage of the shrinkability and the internal shrink stress of the film.

Shrink films can be classified into two categories as follows: (1) biaxially oriented film for over-wrapping wherein the film shrinks in both the x- and y-axis directions, and (2) uniaxially oriented sleeves which are widely used as tamper evident labels on food and pharmaceutical products and as primary labels on beverage bottles. This film primarily shrinks in the stretched or oriented direction and ideally has less than 5 to 10 percent shrinkage in the unstretched or nonoriented direction and desirably has no shrinkage in the unstretched or nonoriented direction. Usually these films are made into a tube shape, and after being wrapped around a bottle or around more than one pipe, for example, the film is shrunk by the application of heat so as to wrap or to parcel together the object or objects.

The materials used for the films mentioned above include poly(vinylchloride) (PVC), polystyrene, oriented polyethylene, oriented polypropylene, hydrochlorinated rubber, and polyesters. However, the aforementioned materials are not without their problems. For example, poly(vinyl chloride) generates chlorine gas when burned for disposal, and printing characters and graphics on polyethylene film is difficult.

Presently, PVC is the most widely used material due to its excellent shrink properties, good clarity and is low in cost. Ideally, polyester shrink films would have properties very similar to PVC films so that the polyester can serve as a "drop-in" replacement on existing shrink tunnel equipment. PVC film properties that are desired for duplication include: (1) a relatively low onset temperature for shrinkage, (2) a total shrinkage which increases gradually and in a controlled manner with increasing temperature, (3) a low shrink force to prevent crushing of the underlying container, (4) a high total shrinkage (for example, 50 percent or greater) and (5) an inherent film toughness so as to prevent unnecessary tearing and splitting of the film prior to and after shrinkage.

Accordingly, it is desirable to prepare a polyester heat-shrinkable film that has similar shrink properties as PVC but without the environmental problems described above.

U.S. Pat. No. 5,859,116 issued to Shih on Jan. 12, 1999 discloses a heat-shrinkable film comprising a copolyester blend having 1 to 98.5 weight. percent of a PETG copolyester containing at least 95 mole percent terephthalic acid, 65 to 80 mole percent ethylene glycol and 35 to 20 mole percent CHDM; 98.5 to 1 weight. percent of a PET copolyester containing at least 75 mole percent terephthalic acid, 50 to 90 mole percent ethylene glycol and 50 to 10 mole percent diethylene glycol; and, optionally, 5 to 15 weight. percent of a crystallizable polyester such as PET.

U.S. Pat. No. 4,963,418 issued to Isaka et al. on Oct. 16, 1990 discloses a polyester heat-shrinkable film having a shrink ratio in the first axis of not less than 30 percent at 80° C. and not less than 50 percent at 100° C. and a shrink ratio in the perpendicular axis to the first axis of not more than 15 percent at a temperature of from 55–105° C. The polyester components of the film all have glass transition temperatures above 95° F. (35° C.).

U.S. Pat. No. 3,187,075 issued to Seifried et al. on Jun. 1, 1965 discloses a method for making plastic films which, when heated at temperatures less than 100° C., will shrink at least 30 percent in both directions.

U.S. Pat. No. 4,814,426 issued to Utsumi et al. on Mar. 21, 1989 discloses a heat-shrinkable polyester film having 100 to 30 parts by weight of a crystalline polyester (A), in which 70 to 100 mole percent of the dicarboxylic acid residue moiety is terephthalic acid and 50 to 100 mole percent of the glycol residue moiety is 1,4-cyclohexanedimethanol, having a heat of crystalline melting of not less than 3 cal/g and a melting point in the range of 200° to 310° C. and 0 to 70 parts by weight of a polyester (B) comprising terephthalic acid and/or 2,6-naphthalene dicarboxylic acid as the dicarboxylic acid residue moiety and ethylene glycol and/or 1,4-butadiene glycol as the glycol residue moiety. The polyester film has a ratio of shrinkage in the range of 40 to 90 percent in either of the longitudinal and transverse directions after 5-minute heat treatment at 100° C., the ratio of shrinkage or expansion is not more than 15 percent in the other direction after 5-minute heat treatment at 100° C. and a haze of not more than 10 percent at a thickness of 35 microns.

U.S. Pat. No. 5,985,387 issued to Mori et al. on Nov. 16, 1999 discloses a heat-shrinkable polyester film wherein the thermal shrinkage ratio in a main shrinking direction is about 20 percent or more after being treated in water of about 70° C. for about 5 seconds, about 35 to about 55 percent after treated in water of about 75° C. for about 5 seconds, and about 50 to about 60 percent after being treated in water of about 80° C. for about 5 seconds, and after the film is shrunk by about 5 percent by treatment in water of about 75° C. for about 10 seconds, the probability of the elongation at rupture of the film in the direction perpendicular to the main shrinking direction being about 20 percent or less, is about 10 percent or less.

U.S. Pat. No. 5,580,911 issued to Buchanan et al. on Dec. 3, 1996 discloses binary blends of cellulose esters and aliphatic-aromatic copolyesters, binary blends of cellulose esters and aliphatic polyesters, and ternary blends of cellulose esters and/or aliphatic polyesters and/or aliphatic-aromatic copolyesters and/or polymeric compounds.

Accordingly, there is a need for a polyester heat-shrinkable film having a relatively low onset temperature for shrinkage, which has an inherent film toughness so as to prevent unnecessary tearing and splitting of the film prior to and after shrinkage.

SUMMARY OF THE INVENTION

Briefly, the present invention is for a compositional blend of a polyester and an aliphatic-aromatic copolyester and a heat-shrinkable film made from the blend. The blend includes (A) from about 50 to about 99 weight percent a polyester comprising:
  (1) an acid residue moiety comprising from about 60 to 100 mole percent terephthalic acid and from 0 to about 40 mole percent of a second acid selected from the group consisting of isophthalic acid, adipic acid, azelaic acid, naphthalenedicarboxylic acid, succinic acid, cyclohexanedicarboxylic acid; and mixtures thereof; and
  (2) a diol residue moiety comprising from about:
    i. 0–50 mole percent diethylene glycol;
    ii. 0–100 mole percent 1,4-cyclohexanedimethanol;
    iii. 0–50 mole percent neopentyl glycol;
    iv. 0–50 mole percent propanediol;
    v. 0–100 mole percent 1,4-butanediol; and
    vi. remaining mole percent is ethylene glycol; and (B) from about 1 to about 50 weight percent of an essentially, linear, random aliphatic-aromatic copolyester or branched and/or chain extended copolyester thereof and having an inherent viscosity of about 0.2 to about 2.0 deciliters/gram as measured at a temperature of 25° C. for a 0.5 g sample in 100 ml of a 60/40 parts by weight solution of phenol/tetrachloroethane and having repeating units of:

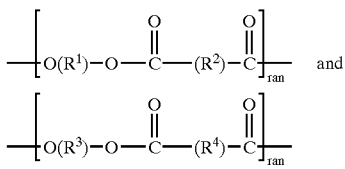

and wherein
  $R^1$ is selected from one or more of the groups consisting of $C_2$–$C_8$ alkylene or oxylalkylene, and the mole percent of $R^1$ is from about 80 to 100;
  $R^3$ is selected from one or more of the groups consisting of $C_2$–$C_8$ alkylene or oxylalkylene; $C_2$–$C_8$ alkylene or oxylalkylene substituted with one to four substituents independently selected from the group consisting of halo, $C_6$–$C_{10}$ aryl, and $C_1$–$C_4$ alkoxy; $C_5$–$C_{12}$ cycloalkylene (for example, 1,4-cyclohexanedimethanol); $C_5$–$C_{12}$ cycloalkylene substituted with one to four substituents independently selected from the group consisting of halo, $C_6$–$C_{10}$ aryl, and $C_1$–$C_4$ alkoxy; and the mole percent of $R^3$ is from 0 to about 20;
  $R^2$ is selected from one or more of the groups consisting of $C_2$–$C_{12}$ alkylene or oxyalkylene; $C_2$–$C_{12}$ alkylene or oxylalkylene substituted with one to four substituents independently selected from the group consisting of halo, $C_6$–$C_{10}$ aryl, and $C_1$–$C_4$ alkoxy; $C_5$–$C_{10}$ cycloalkylene; $C_5$–$C_{10}$ cycloalkylene substituted with one to four substituents independently selected from the group consisting of halo, $C_6$–$C_{10}$ aryl, and $C_1$–$C_4$ alkoxy; and the mole percent of $R^2$ is from about 35 to about 95;
  $R^4$ is selected from one or more of the groups consisting of $C_6$–$C_{10}$ aryl; $C_6$–$C_{10}$ aryl substituted with one to four substituents independently selected from the group consisting of halo, $C_6$–$C_{10}$ aryl, and $C_1$–$C_4$ alkoxy; $C_5$–$C_{10}$ cycloalkylene; $C_5$–$C_{10}$ cycloalkylene substituted with one to four substituents independently selected from the group consisting of halo, $C_6$–$C_{10}$ aryl, and $C_1$–$C_4$ alkoxy; and the mole percent of $R^4$ is from about 5 to about 65;

wherein the weight percentages are based on the total weight of components (A) and (B);
  the mole percentages of component (A) are based on 100 mole percent of the acid residue moiety and 100 mole percent of the diol residue moiety; and for component (B) the sum of the mole percent for $R^1$ and $R^3$ is 100 and the sum of the mole percent for $R^2$ and $R^4$ is 100.

Surprisingly, the compositional blends of the polyester and the aliphatic-aromatic copolyester of the present invention exhibit a greater percent shrink at temperatures below about 70° C. than known polyesters or polyester blends used for heat-shrinkable films. Moreover, including the aforementioned weight percent of component (B), i.e., the aliphatic-aromatic copolyester, unexpectedly increased the ductility of the film so that a higher percentage of diethylene glycol (DEG) could be incorporated into a heat-shrinkable film and retain acceptable tensile and shrink properties.

DETAILED DESCRIPTION OF THE INVENTION

Figure 1:
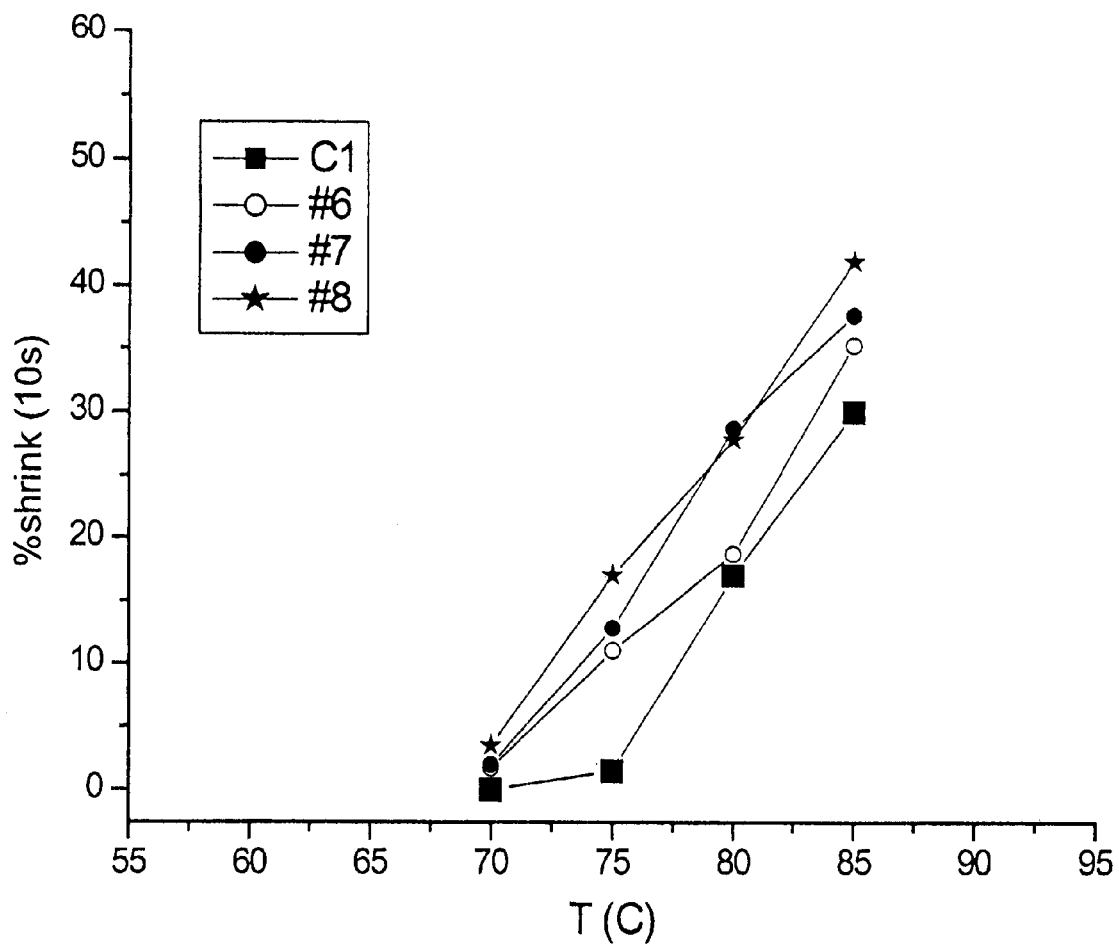
FIG. 1 is comparison plot of temperature vs. percent shrink after about 10 seconds for a polyester described as C1 herein relative to the same polyester having 10, 20, and 30 weight percent of an aliphatic-aromatic copolyester blended therein.

The present invention relates to a compositional blend of a component (A) that is a 30 polyester and a component (B) that is an aliphatic-aromatic copolyester (hereinafter "the compositional blend"), which can be used in heat-shrinkable film applications. A polyester as generally understood in the art has an acid residue moiety with one acid and a diol residue moiety with one diol, whereas a copolyester is understood to have an acid residue moiety comprising a combination of acids and/or a diol residue moiety comprising a combination of diols. However, for ease of description of the invention disclosed herein, the term "polyester" when referring to component (A) shall include polyesters and copolyesters that are reactor grade or that are prepared as blends thereof. As used herein "reactor grade" means a product that is prepared directly from esterification/ transesterification of the acid and diol monomers followed by polycondensation. Component (B) by virtue of its definition is a copolyester.

The compositional blend of the present invention, which is used for the heat-shrinkable film of the present invention, includes component (A) of from about 50 to about 99 weight percent of a polyester comprising an acid residue moiety and a diol residue moiety. The acid residue moiety comprises from about 60 to 100 mole percent terephthalic acid and from 0 to about 40 mole percent of a second acid selected from the group consisting of isophthalic acid, adipic acid, azelaic acid, naphthalenedicarboxylic acid (NDA), succinic acid, cyclohexanedicarboxylic acid (CHDA); and mixtures thereof. The diol residue moiety comprises from 0 to about 50 mole percent diethylene glycol, 0 to 100 mole percent 1,4-cyclohexanedimethanol (CHDM), 0 to about 50 mole percent neopentyl glycol (NPG), 0 to about 50 mole percent propanediol, 0 to 100 mole percent 1,4-butanediol and 0 to 100 mole percent is ethylene glycol;

The preferred mole percentages for the acid and diol residue moieties for component (A) are in Table I below and are presented as preferred, more preferred and most preferred ranges, based on 100 mole percent of the acid residue moiety and 100 mole percent of the diol residue moiety.

TABLE I

| Acid | | Diol | |
|---|---|---|---|
| Isophthalic Acid | 0–20/0–10/0–3 | Diethylene glycol | 0–20/7–12/7–12 |
| Adipic Acid | 0–20/0–10/0–2 | CHDM | 10–35/17–28/10–28 |
| Azelaic Acid | 0–20/0–10/0–2 | NPG | 0–25/0–2/0 |
| NDA | 0–20/0–10/0–2 | 1,4-butanediol | 0–30/0–2/0 |
| Succinic Acid | 0–20/0–10/0–2 | 1,3-propanediol | 0–30/0–2/0 |
| CHDA | 0–30/0–10/0–2 | Ethylene glycol | remainder |
| Terephthalic Acid | 70–100 or 80–100/90–100/ 98–100 | | |

The acid residue moiety of the polyester of component (A) desirably consist essentially of terephthalic acid residues. The acid residue moiety may further be modified with up to about 5 mole percent of other acids which may contain 3 to 20 carbon atoms and may consist of units of aromatic, aliphatic, or alicyclic dicarboxylic acids- or combinations of these dicarboxylic acids. For example, other acids include malonic, glutaric, pimelic, suberic, sebacic, dodecanedioic, 1,4-, 1,5-, and 2,6-decahydronaphthalenedicarboxylic acid, 4,4'-biphenyldicarboxylic, trans 3,3'- and trans-4,4-stilbenedicarboxylic acid, and 4,4'-dibenzyl-dicarboxylic acid.

The diol residue moiety of the polyester of component (A) in this invention may be replaced with up to about 35 mole percent, preferably 20 mole percent and more preferably less than about 10 mole percent, of other glycols containing from about 2 to about 10 carbon atoms such as 1,5-pentanediol or 1,6-hexanediol.

The compositional blend further includes component (B) of from about 1 to about 50 weight percent of an essentially, linear, random aliphatic-aromatic copolyester or branched and/or chain extended copolyester thereof (hereinafter referred to as AAPE). The AAPE has an inherent viscosity of about 0.2 to about 2.0 deciliters/gram as measured at a temperature of 25° C. for a 0.5 g sample in 100 ml of a 60/40 parts by weight solution of phenol/tetrachloroethane.

The AAPE used in the present invention include those described in U.S. Pat. Nos. 5,661,193; 5,599,858; 5,580,911; and 5,446,079, the entire disclosures of each patent being incorporated herein by reference. More specifically, the AAPEs are essentially, linear, random copolyesters or branched and/or chain extended copolyesters thereof preferably having repeating units of:

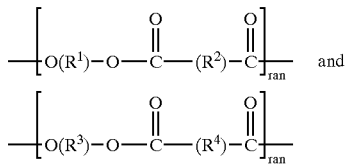

wherein $R^1$ is selected from one or more of the groups consisting of $C_2$–$C_8$ alkylene or oxylalkylene and the mole percent of $R^1$ is from about 80 to 100;

$R^3$ is selected from one or more of the groups consisting of $C_2$–$C_8$ alkylene or oxylalkylene; $C_2$–$C_8$ alkylene or oxylalkylene substituted with one to four substituents independently selected from the group consisting of halo, $C_6$–$C_{10}$ aryl, and $C_1$–$C_4$ alkoxy; $C_5$–$C_{12}$ cycloalkylene (for example, 1,4-cyclohexanedimethanol); $C_5$–$C_{12}$ cycloalkylene substituted with one to four substituents independently selected from the group consisting of halo, $C_6$–$C_{10}$ aryl, and $C_1$–$C_4$ alkoxy; and the mole percent of $R^3$ is from 0 to about 20;

$R^2$ is selected from one or more of the groups consisting of $C_2$–$C_{12}$ alkylene or oxylalkylene; $C_2$–$C_{12}$ alkylene or oxylalkylene substituted with one to four substituents independently selected from the group consisting of halo, $C_6$–$C_{10}$ aryl, and $C_1$–$C_4$ alkoxy; $C_5$–$C_{10}$ cycloalkylene; $C_5$–$C_{10}$ cycloalkylene substituted with one to four substituents independently selected from the group consisting of halo, $C_6$–$C_{10}$ aryl, and $C_1$–$C_4$ alkoxy; and the mole percent of $R^2$ is from about 35 to about 95;

$R^4$ is selected from one or more of the groups consisting of $C_6$–$C_{10}$ aryl; $C_6$–$C_{10}$ aryl substituted with one to four substituents independently selected from the group consisting of halo, $C_6$–$C_{10}$ aryl, and $C_1$–$C_4$ alkoxy; $C_5$–$C_{10}$ cycloalkylene; $C_5$–$C_{10}$ cycloalkylene substituted with one to four substituents independently selected from the group consisting of halo, $C_6$–$C_{10}$ aryl, and $C_1$–$C_4$ alkoxy; and the mole percent of $R^4$ is from about 5 to about 65.

The weight percentages are based on the total weight of components (A) and (B). The mole percent of component (A) is based on 100 mole percent acid residue moiety and 100 mole percent diol residue moiety. For component (B), the sum of the mole percent for $R^1$ and $R^3$ is 100 and the sum of the mole percent for $R^2$ and $R^4$ is 100.

Preferred AAPEs are those wherein $R^1$ is selected from $C_2$–$C_8$ alklyene and is present in an amount of from about 90 to 100 mole percent; $R^3$ is present in an amount of from 0 to about 10 mole percent; $R^1$ is selected from one or more of the groups consisting of $C_2$–$C_8$ alkylene or oxylalkylene and is present in an amount from about 35 to about 95 mole percent; and $R^4$ is selected from one or more of the groups consisting of $C_6$–$C_{10}$ aryl and is present in an amount of from about 5 to about 65 mole percent and wherein the sum of the mole percents of $R^1$ and $R^3$ equals 100 and the sum of the mole percents of $R^2$ and $R^4$ equals 100.

More preferred AAPEs are those wherein $R^1$ is selected from $C_2$–$C_4$ alklyene and is present from about 95 to 100 mole percent; $R^3$ is present from 0 to about 5 mole percent; $R^2$ is selected from one or more of the groups consisting of $C_2$–$C_6$ alkylene or $C_2$ oxyalkylene and is present from about 35 to about 65 mole percent; $R^4$ is 1,4-disubstituted-$C_6$ aryl and is present from about 35 to about 65 mole percent.

Preferred mole percent for the acid residue moiety and the diol residue moiety for component (B) are in Table II below and are presented as first broadly, then preferred and then most preferred ranges, based on 100 mole percent of a acid component and 100 mole percent of a diol component. Most preferably, the aliphatic acid is adipic acid, the aromatic acid is terephthalic acid and the primary diol is 1,4-butanediol. For comparison to the formula above, the primary diol residue is represented by $R^1$, the modifying diol residue is represented by $R^3$, the aliphatic acid residue is represented by $R^2$, and the aromatic acid residue is represented by $R^4$.

TABLE II

| Acid Residue | | Diol Residue | |
|---|---|---|---|
| Aliphatic acid of adipic, | 30–75 | Primary diol of | 70–100 |
| glutaric, succinic, azelaic | 40–60 | 1,4-butanediol, | 90–100 |
| acid and mixtures thereof | 55–60 | 1,6-hexanediol and | 95–100 |
| Aromatic acid of terephthalic, | 25–70 | mixtures thereof | |
| isophthalic, | 40–60 | Modifying diol of | 0–30 |
| naphthalenedicarboxylic and | 40–45 | ethylene glycol, | 0–10 |
| mixtures thereof | | CHDM, diethylene glycol, NPG, propane-diol and mixtures thereof | 0–5 |

For both components (A) and (B), any of the naphthalenedicarboxylic acid isomers or mixtures of isomers may be used with the 1,4-, 1,5-, 2,6- and 2,7-isomers being preferred and with the 2,6-isomer being most preferred. The 1,3- or 1,4-cyclohexanedicarboxylic acid may be as the cis-, trans- or cis/trans mixtures of isomers. The 1,4-cyclohexanedimethanol may be cis, trans or a cis-/trans-mixture of 1,4-cyclohexanedimethanol.

As used herein the terms "alkyl" and "alkylene" refer to either straight or branched chain moieties such as —$CH_2$—$CH_2$—$CH_2$ —$CH_2$-and-$CH_2CH(X)$—$CH_2$—. The term "oxyalkylene" refers to alkylene chains containing from 1 to 4 ether oxygen groups. The term "cycloalkylene" refers to any alkyl group that contains a cycloalkyl moiety.

Most preferred compositions for these AAPE are those prepared from the following diols and acids (or polyester forming derivatives thereof) in the following mole percent, based on 100 mole percent of a acid component and 100 mole percent of a diol component:

(1) glutaric acid (about 30 to about 75 percent); terephthalic acid (about 25 to about 70 percent); 1,4-butanediol (about 90 to 100 percent); and modifying diol (0 about 10 percent).

(2) succinic acid (about 30 to about 95 percent); terephthalic acid (about 5 to about 70 percent); 1,4-butanediol (about 90 to 100 percent); and modifying diol (0 to about 10 percent).

(3) adipic acid (about 30 to about 75 percent); terephthalic acid (about 25 to about 70 percent); 1,4-butanediol (about 90 to 100 percent); and modifying diol (0 to about 10 percent).

The modifying diol is preferably selected from 1,4-cyclohexanedimethanol, triethylene glycol, polyethylene glycol and neopentyl glycol.

Specific examples of most preferred AAPE include a poly(tetramethylene glutarate-co-terephthalate) containing (a) 50% glutaric acid/50% terephthalic acid/100% 1,4-butanediol, (b) 60% glutaric acid/40% terephthalic acid/100% 1,4-butanediol or (c) 40% glutaric acid/60% terephthalic acid/100% 1,4-butanediol; a poly(tetramethylene succinate-co-terephthalate) containing (a) 85% succinic acid/15% terephthalic acid/100% 1,4-butanediol or (b) 70% succinic acid/30% terephthalic acid/100% 1,4-butanediol; a poly(ethylene succinate-co-terephthalate) containing 70% succinic acid/30% terephthalic acid/100% ethylene glycol; and a poly(tetramethylene adipate-co-terephthalate) containing 85% adipic acid/15% terephthalic acid/100% 1,4-butanediol.

Desirably, the AAPE has from about 10 to about 1,000 repeating units and preferably, from about 15 to about 600 repeating units. Preferably, the AAPE has an inherent viscosity of about 0.4 to about 2.0 dL/g, more preferably about 0.7 to about 1.4, as measured at a temperature of 25° C. for a 0.5 gram sample in 100 ml of a 60/40 by eight solution of phenol/tetrachloroethane.

Desirably, the AAPE have a glass transition temperature below 140° F. (60° C.), preferably below 70° F. (21° C.) and most preferably below 32° F. (0° C.). Having a lower glass transition temperature helps to improve the low temperature shrink properties of the resin. Furthermore, having a glass transition temperature below room temperature makes the AAPE serve as a toughening agent and impact modifier The polyester of the present invention may also contain a branching agent. The weight percent ranges for the branching agent are from about 0.01 to about 10 percent, preferably 0.1 to 1.0 weight percent, based on the total weight percent of the polyester blend. The branching agent preferably has a weight average molecular weight of about 50 to about 5000, more preferably about 92 to about 3000, and a functionality of about 3 to about 6. Conventional branching agents include polyfunctional acids, anhydrides, alcohols and mixtures thereof. Desirably, the branching agent may be a polyol having 3 to 6 hydroxyl groups, a polycarboxylic acid having 3 or 4 carboxyl groups or a hydroxy acid having a total of 3 to 6 hydroxyl and carboxyl groups.

Representative low molecular weight polyols that function as branching agents include glycerol, trimethylolpropane, 1,2,4-butanetriol, pentaerythritol, 1,2,6-hexanetriol, sorbitol, 1,1,4,4-tetrakis (hydroxymethyl) cyclohexane, tris(2-hydroxyethyl) isocyanurate, and dipentaerythritol. Particular branching agent examples of higher molecular weight polyols (MW 400–3000) are triols derived by condensing alkylene oxides having 2 to 3 carbons, such as ethylene oxide and propylene oxide with polyol initiators.

Representative polycarboxylic acids that may be used as branching agents include hemimellitic acid, trimellitic acid, trimesic acid, pyromellitic acid, benzene tetracarboxylic acid, benzophenone tetracarboxylic acid, 1,1,2,2-ethanetetracarboxylic acid, 1,1,2-ethanetricarboxylic acid, 1,3,5-pentanetricarboxylic acid, and 1,2,3,4-cyclopentanetetra-carboxylic acid. Although the acids may be used as such, preferably they are used in the form of their lower alkyl esters or their cyclic anhydrides in those instances where cyclic anhydrides can be formed.

Representative hydroxy acids suitable as a branching agent include malic acid, citric acid, tartaric acid, 3-hydroxyglutaric acid, mucic acid, trihydroxyglutaric acid, and 4-(beta-hydroxyethyl)phthalic acid. Such hydroxy acids contain a combination of 3 or more hydroxyl and carboxyl groups.

Especially preferred branching agents include trimellitic acid, trimesic acid, pentaerythritol, trimethylol propane and 1,2,4-butanetriol.

One example of the branched AAPE of the present invention is poly(tetramethylene adipate-co-terephthalate)

containing 100 mole percent 1,4-butanediol, 43 mole percent terephthalic acid and 57 mole percent adipic acid and being branched with 0.5 weight percent pentaerythritol. This copolyester is produced when dimethyladipate, dimethyl terephthalate, pentaerythritol and 1,4-butanediol are heated at 190° C. for 1 hour, 200° C. for 2 hours, 210° C. for 1 hour, then at 250° C. for 1.5 hours under vacuum in the presence of 100 ppm of Ti present initially as Ti(O$^i$Pr)$_4$. The copolyester is typically pelletized after formation for use in extrusion foaming.

Another branched AAPE of the present invention is poly(tetramethylene adipate-co-terephthalate) containing 100 mole percent 1,4-butanediol, 43 mole percent terephthalic acid and 57 mole percent adipic acid and being branched with 0.3 weight percent pyromellitic dianhydride. This copolyester is produced via reactive extrusion of linear poly(tetramethylene adipate-co-terephthalate) with pyromellitic dianhydride using an extruder.

The polyester of the present invention may also contain a chain extender. Exemplary chain extenders are divinyl ethers as disclosed in U.S. Pat. No. 5,817,721 and herein incorporated by reference. Preferred divinyl ethers are 1,4-butanediol divinyl ether, 1,5-hexanediol divinyl ether and 1,4-cyclohexandimethanol divinyl ether. The weight percent ranges for the chain extender are from 0.01 to 5 percent, preferably 0.3 to 2.5 weight percent, based on the total weight percent of the polyester blend.

The polyester of the present invention may also contain sulfonates or other ionic functionalities. These include, for example 5-sodiosulfoisopthalic acid, 3-sodiosulfoisophtalic acid, 3-sodiosulfobenzoic acid, etc. where the sulfonate group has been neutralized with a sodium counterion. Other standard cations such as calcium, zinc, lithium, etc. that are well known in the industry can also be used.

The polyesters and copolyesters of the present invention are prepared by conventional polycondensation processes that are well known in the art. For example, such polyesters may be prepared by direct condensation of the acid(s) with the glycol(s) or by ester interchange using ester-forming derivatives. Such derivatives include functional acid derivatives such as the dimethyl, diethyl, or dipropyl ester of the dicarboxylic acid and anhydrides or acid halides of acids.

Typically, such reactions are usually carried out at temperatures from 150° C. to 300° C. in the presence of polycondensation catalysts such as titanium tetrachloride, manganese diacetate, antimony oxide, dibutyl tin diacetate, zinc chloride, or combinations thereof The catalysts are typically employed in amounts between 10 to 1000 ppm, based on total weight of the reactants. For the purpose of the present invention, a representative aliphatic polyester is the polycondensation product of dimethylglutarate and 1,6-hexanediol. This polyester, poly(hexamethylene glutarate), is produced when dimethylglutarate and 1,6-hexanediol are heated at approximately 210° C. for 4 hours and then at 260° C. for 1.5 hours under vacuum in the presence of 100 ppm of Ti. A representative aliphatic-aromatic copolyester is poly(tetramethylene glutarate-coterephthalate) containing 30 mole per cent terephthalate. This polyester is produced when dimethylglutarate, dimethyl terephthalate, and 1,4-butanediol are heated at 200° C. for 1 hour then at 245° C. for 0.9 hour under vacuum in the presence of 100 ppm of Ti present initially as Ti(O$^i$Pr)$_4$.

The copolyester blends of the present invention may include any various additives conventional in the art. For example, the polyester blend can include from about 0.01 to about 50 weight percent, based on the total weight of the composition, of at least one additional additive selected from a lubricant, a non-polymeric plasticizer, a thermal stabilizer, an antioxidant, a pro-oxidant, an acid scavenger, an ultraviolet light stabilizer, a promoter of photodegradation, an antistatic agent, a pigment, a dye, and a colorant. Typical non-polymeric plasticizers include dioctyl adipate, phosphates, and diethyl phthalate. Representative inorganics include talc, $TiO_2$, $CaCO_3$, $NH_4Cl$, and silica. Colorants can be monomeric, oligomeric, and polymeric. Preferred polymeric colorants are aliphatic polyesters, aliphatic-aromatic copolyesters, or aromatic polyesters in which the color producing monomer, i.e., a dye, is covalently incorporated into the polymer. Such representative polymeric colorants are described by Weaver et al. in U.S. Pat. Nos. 4,892,922, 4,892,923, 4,882,412, 4,845,188, 4,826,903, and 4,749,773 the entire disclosures of which are incorporated herein by reference.

Physical mixing of the components to form a blend can be accomplished in a number of ways, such as mixing the components in an appropriate solvent, for example, acetone, THF, $CH_2Cl_2$ /MeOH, $CHCl_3$, dioxane, DMF, DMSO, AcOMe, AcOEt, and pyridine, followed by film casting. Preferably, the blend components are mixed by thermal compounding. The most preferred method is by thermally compounding in an apparatus such as a batch mixer, ribbon blender, banbury mixer, roll mill, torque rheometer, a single screw extruder, or a twin screw extruder. The blends produced by thermally compounding can be converted to thin films by a number of methods known to those skilled in the art.

The polyester blend may also be formed into a film by any well-known method such as extrusion and calendering. The polyesters, typically in pellet form, are mixed together in a tumbler and then placed in a hopper of an extruder for melting compounding. Alternatively, the pellets may be added to the hopper of an extruder by various feeders, which meter the pellets in their desired weight ratios. Upon exiting the extruder the now homogeneous copolyester blend is shaped into a film. The shape of the film is not restricted in any way. For example, it may be a flat sheet or a tube. The film obtained may be stretched, for example, in a certain direction by from 2 to 6 times the original measurements.

The stretching method may be by any of the method known in the art, such as, the roll stretching method, the long-gap stretching method, the tenter-stretching method, and the tubular stretching method. With use of any of these methods, it is possible to conduct biaxial stretching in succession, simultaneous biaxial stretching, uni-axial stretching, or a combination of these. With the biaxial stretching mentioned above, stretching in the machine direction and transverse direction may be done at the same time. Also the stretching may be done first in one direction and then in the other direction to result in effective biaxial stretching.

Desirably, in stretching the film, it is preliminarily heated to a temperature in the range of a mean glass transition temperature ($T_g$) of the blend polymer composition to $T_g+5°$ C. to $T_g+80°$ C., preferably $T_g+10°$ C. to $T_g+20°$ C. Preferably the film is stretched at of rate of about 5 to 50 centimeters per second (about 2 to 20 in./sec). The stretch ratio is defined as the draw ratio in the x-axis direction to the draw ratio in the y-axis direction. The draw ratio is the final length of the film divided by the original length of the film.

The present invention is illustrated in greater detail by the specific examples presented below. It is to be understood that these examples are illustrative embodiments and are not intended to be limiting of the invention, but rather are to be construed broadly within the scope and content of the appended claims.

In the following examples, tensile strength was determined according to ASTM D882. Elmendorf tear strength in the stretch and non-stretch direction was determined according to ASTM D1922. The percent shrinkage was determined as follows:

Strips of film were cut in 3.9 inch by 3.9 inch (100 mm×100 mm) squares. These were immersed in a hot oil bath for either 10 seconds or 30 seconds at a given bath temperature and then removed and dried. The percent shrinkage is determined from the equation % shrink=$(Lo-Lf)/Lo$ where Lo is the unshrunk length and Lf is the length after shrinkage. The theoretical maximum shrinkage for a given stretch is obtained from theoretical max % shrinkage=$100(\Lambda-1)/\Lambda$ wherein $\Lambda$ is the stretch ratio. Thus, for a 4× stretched film (the T. M. Long stretched samples in the present work), the maximum possible shrinkage is 75 percent whereas for a 5× film stretched film (more typical of commercial tenter frames) the theoretical maximum is 80 percent.

A number of different copolyester resins were prepared and are listed in Table III below. Samples denoted with a "C" in front are comparative samples and do not include an aliphatic-aromatic additive. The blends in Table III were made by pellet/pellet melt blending using a twin screw extruder unless specified differently.

Component A is either a reactor grade polyester having 100 mole percent terephthalic acid and the mole percent of the specified diol or a blend of specified polyesters. Component B is an AAPE having approximately 57 mole percent adipic acid, 43 mole percent terephthalic acid and 100 mole percent 1,4-butanediol with a Tg of about −27° F. (−33° C.).

SAMPLE PREPARATION

Polyesters C1–C5 are commercially available from Eastman Chemical Company, Kingsport, Tenn. C1 was EASTAR 6763; C2 was EMBRACE 21214; C3 was EASTOBOND; C4 was an 80/20 blend of C1 and C3; and C5 was an 80/20 blend of C2 and C3.

Samples 6–8 were blends of C1 and Component (B) in the specified weight %.

Sample 9 was a polyester blend in accordance with the present invention having 90 weight % of Component (A) and 10 weight % of Component (B), wherein Component (A) is a 90/10 weight % blend of C2 and C3.

Sample 10 was a polyester blend in accordance with the present invention having 90 weight % of Component (A) and 10 weight % of Component (B), wherein Component (A) is an 80/20 weight % blend of C2 and C3, i.e., C5.

Sample 11 was a polyester blend in accordance with the present invention having 80 weight % of Component (A) and 20 weight % of Component (B), wherein Component (A) is an 80/20 weight % blend of C2 and C3, i.e., C5.

In samples 12–14 the blend was prepared using a two-step blending process. Sample 12 was a polyester blend in accordance with the present invention having 95 weight % of C2 and 5 weight % of a concentrate, wherein the concentrate is a 70/30 weight % blend of C3 and Component (B) to give a final composition of 1.5 weight % of Component (B) in the blend.

Sample 13 is a polyester blend in accordance with the present invention having 90 weight % of C2 and 10 weight % of the concentrate described above, to give a final composition of 3 weight % of Component (B) in the blend.

Sample 14 is a polyester blend in accordance with the present invention having 85 eight % of C2 and 15 weight % of the concentrate described above, to give a final composition of 4.5 weight % of Component (B) in the blend.

TABLE III

| | Glycols in Component (A) (mole %) | | | % aliphatic- |
|---|---|---|---|---|
| Sample | EG | CHDM | DEG | aromatic (B) |
| C1 | 67 | 31 | 2 | 0 |
| C2 | 71 | 20 | 9 | 0 |
| C3 | 63 | 0 | 37 | 0 |
| C4 | 66 | 25 | 9 | 0 |
| C5 | 69.4 | 16 | 14.6 | 0 |
| 6 | 67 | 31 | 2 | 10 |
| 7 | 67 | 31 | 2 | 20 |
| 8 | 67 | 31 | 2 | 30 |
| 9 | 70.2 | 18 | 11.8 | 10 |
| 10 | 69.4 | 16 | 14.6 | 10 |
| 11 | 69.4 | 16 | 14.6 | 20 |
| 12 | 70.7 | 19.3 | 10 | 1.5 |
| 13 | 70.5 | 18.5 | 11 | 3 |
| 14 | 70.2 | 17.8 | 12 | 4.5 |

For each sample, 10 mil film was extruded using a 1 inch Killion extruder L/D=24:1 and nominal melt temperatures of 465 to 480° F. (240 to 250° C.). Samples of the film were stretched at 195F (90° C.) to 4×1.

EXAMPLE 1

As part of the initial screening work to determine the effectiveness of the aliphatic aromatic component, selected samples of the unoriented, cast film were aged for 1, 10, or 100 hours at 140° F. (60° C.) in air. Tensile tests were performed after aging and the elongation at break was recorded as a measure of the ductility and physical aging resistance. The elongation at break (% EOB) is tabulated in Table IV below for the various samples. Values greater than about 300% generally constitute a ductile film whereas values less than about 10% denote brittleness.

TABLE IV

| | 1 Hr | | 10 Hr | | 100 Hr | |
|---|---|---|---|---|---|---|
| Sample | % EOB | Standard Deviation | % EOB | Standard Deviation | % EOB | Standard Deviation |
| C1 | 476.5 | 10.7 | 5.6 | 0.21615 | 5.7 | 0.26077 |
| C2 | 103.8 | 87.3 | 5.2 | 0.3544 | 5.3 | 0.28705 |
| C4 | 5.8 | 0.2 | 5.4 | 0.32323 | 6.0 | 0.22379 |
| #6 | 416.9 | 19.3 | 88.2 | 73.59806 | 5.7 | 0.32075 |
| #7 | 434.1 | 8.2 | 424.5 | 18.64702 | 6.1 | 0.14311 |
| #8 | 478.8 | 14.5 | 391.0 | 72.04157 | 353.6 | 55.56516 |

As can be see from Table IV, all of the comparative samples showed embrittlement with aging as denoted by the significant drop in elongation at break (% EOB) with aging time. Sample, C2 and C4, with the higher DEG, were brittle after only 1 hr. However, the samples containing the aliphatic-aromatic copolyester (compare C1 with #6, #7, and #8) were much more resistant to aging induced embrittlement. Thus, the addition of an aliphatic-aromatic copolyester substantially improves toughness and ductility.

EXAMPLE 2

The addition of the aliphatic-aromatic component is found to improve the overall toughness and tear resistance of an oriented film as well. Samples of film made from C2 and

13, (which are similar in composition except for the presence of the aliphatic-aromatic in #13) were stretched 5×1 at 140° F. (90° C.) on a commercial tenter frame. These samples were then tested in the stretch and non-stretch directions to determine the films toughness (these films were not oven aged as in the previous example). The elongation at break in the stretch direction was 33% and 48% respectively for C2 and #13. Elongation at break in the weaker, non-stretch direction was 430% and 483%. The average tear resistance (ASTM D1938) in the stretch direction was 1.15 N/mm and 26.07 N/mm for C2 and #13, respectively, whereas in the non-stretch direction it was 19.6 N/mm and 22.6 N/mm. The Elmendorf tear strength (ASTM D1922) was 3324 g/mm and 4663 g/mm in the non-stretch direction and 159 g/mm and 448 g/mm in the stretch direction (for C2 and #13 respectively). From these results, it is seen that a tear parallel to the orientation direction will propagate much more quickly in the C2 control as compared with the aliphatic-aromatic modified sample. This implies a greater probability for web breakage during film handling, printing, etc. The addition of component B helps to significantly minimize the likelihood of tearing so the film could be downgaged further (to reduce cost) without worrying about handling problems

EXAMPLE 3

The samples described above, except for sample C3 which is normally too brittle to be cast into film, were stretched 4×1 at 195° F. (90° C.) using a T. M. Long laboratory film stretcher unless otherwise noted. After stretching, the samples were then analyzed to determine the shrinkage versus temperature curve at after 10 seconds, FIG. 1, or 30 seconds, FIG. 2, at the specified temperatures.

Referring to FIG. 1, The 10 second shrink for sample C1, with and without modification with component B is illustrated. As can be seen, the inclusion of an aliphatic-aromatic polyester helps to shift the shrink curve to lower temperatures which is highly desirable since it ensures adequate shrinkage. Quite unexpectedly, the temperature at where shrinkage begins (known as the "onset of shrink temperature") is found to decrease by 5 to 8° C. with the addition of component B.

Figure 2:
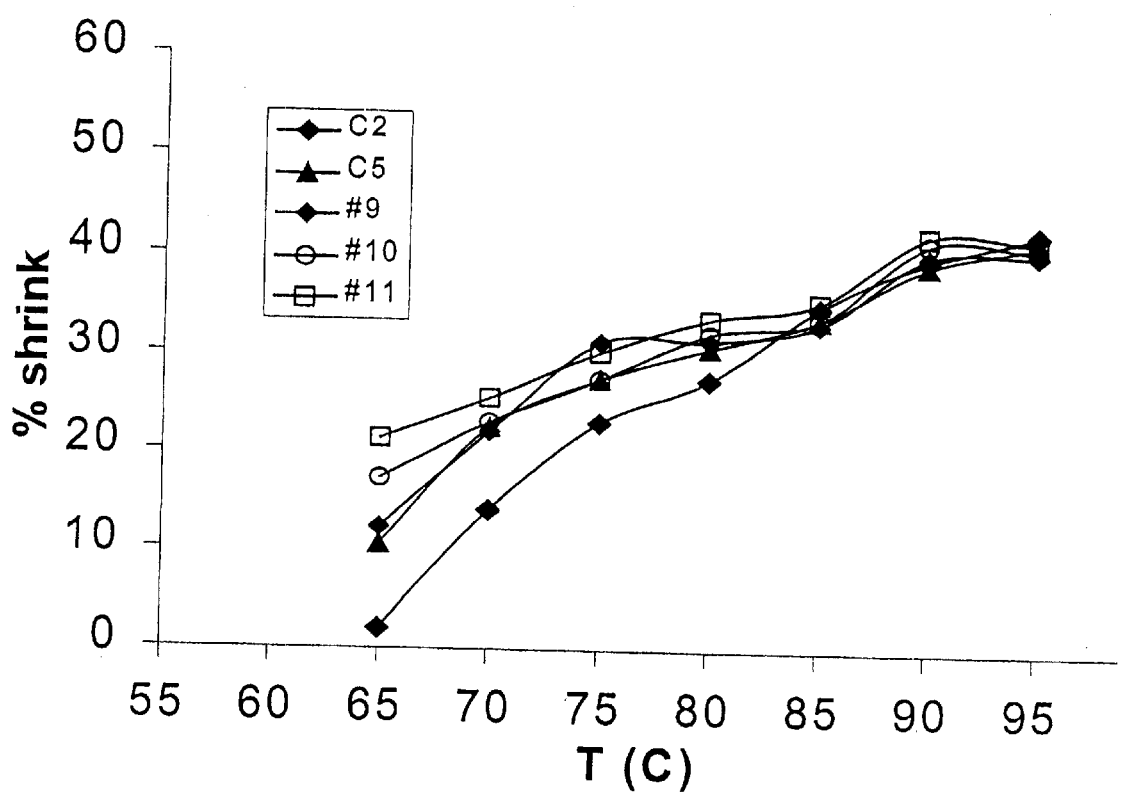
FIG. 2 is a comparison plot of temperature vs. percent shrink after about 30 seconds for a polyester described as C2 herein relative to compositional blends having 10 to 20 weight percent of an aliphatic-aromatic polyester.

Referring to FIG. 2, the 30 second shrink curves for Samples #9 through #11 compared with C2, and C5.

C2 and C5 have high enough levels of DEG that they shrink within the "normal" range for shrink grade copolyesters (onset temperature from 60 to 70° C.). C2 is a commercial shrink copolyester (reactor grade, random copolyester), whereas C5, although similar in composition, is obtained by blending two copolyesters. Comparing C5 and #9 (both have approximately 20% total modification to the base C2 resin) the aliphatic-aromatic component helps to reduce the shrink onset temperature more than what can be attributed to the inclusion of DEG.

It was further surprisingly discovered that the elongation at break in the non-stretch direction (the weaker direction for the oriented film), is approximately 200% for sample 9 and is less than 10% for C5. Without component B, the film is very brittle and will be susceptible to tear during winding and/or handling of the film. Samples #10 and #1 1 had elongation at break values of approximately 100% and 500% respectively in the non-stretch direction. Clearly, component B has the further advantage of offsetting the increase in brittleness attributed to increasing the DEG level.

Figure 3:
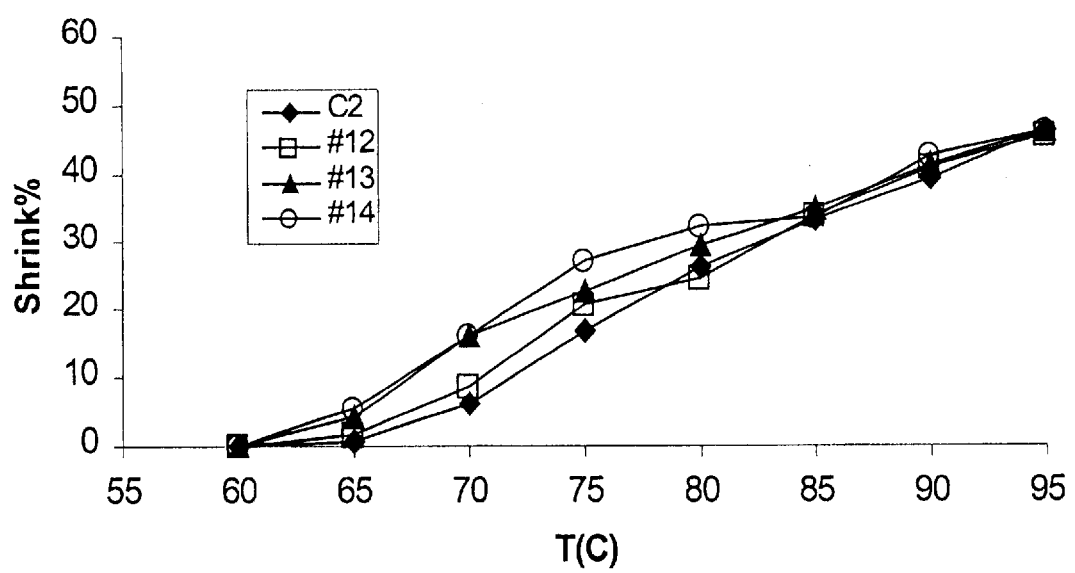
FIG. 3 is a comparison plot of temperature vs. percent shrink after about 30 seconds for a polyester described as C2 herein relative to compositional blends having 1.5–4.5 weight percent of an aliphatic-aromatic polyester.

Referring to FIG. 3 are the shrink curves for samples 12, 13, and 14 compared to C2. Samples 12 through 14 were pellet-pellet blended from the concentrate made on the twin screw (5, 10 and 15% of the concentrate respectively). As observed, the addition of the concentrate containing the aliphatic-aromatic component causes the shrink onset temperature to shift to lower temperatures. Furthermore, there is little if any affect on the ultimate shrinkage (i.e. the maximum shrinkage that can occur which is usually represented by the shrinkage at higher temperatures) which is also desirable.

EXAMPLE 4

Another important factor in a shrink film is that it should have a low shrink force so as to not crush the container. The results for shrink force or "maximum shrink stress" are tabulated in Table V below. These numbers are based on the true stress at the end of film stretching (4×1 at 90C) as measured from the T. M. Long laboratory film stretcher which was equipped with force transducers. The final stretching stress is theoretically the same as the shrink stress assuming that the sample is rapidly cooled after stretching to freeze in and retain the molecular orientation (any relaxation will cause a reduction in the shrink force). The results are tabulated in Table V below.

TABLE V

| Sample | Shrink Force (psi) |
| --- | --- |
| C1 | 1430 |
| C2 | 874 |
| C3 | n/a |
| C4 | 1115 |
| C5 | 582 |
| 6 | 1001 |
| 7 | 844 |
| 8 | 390 |
| 9 | 573 |
| 10 | 527 |
| 11 | 402 |
| 12 | 787 |
| 13 | 736 |
| 14 | 722 |

The C1 control had a shrink force of 1430 psi which is quite high. Comparing sample C1 with samples #6, #7 and #8 we find that the aliphatic-aromatic copolyester reduces the shrink force by up to 40%. A similar comparison of C2 with #9, #10, and #11 show the same significant reduction in shrink force. Furthermore the addition of 5, 10 and 15% of the concentrate to C2 (samples #12 through #14) caused up to a 17% reduction in the shrink stress over C2 as well.

Figure 4:
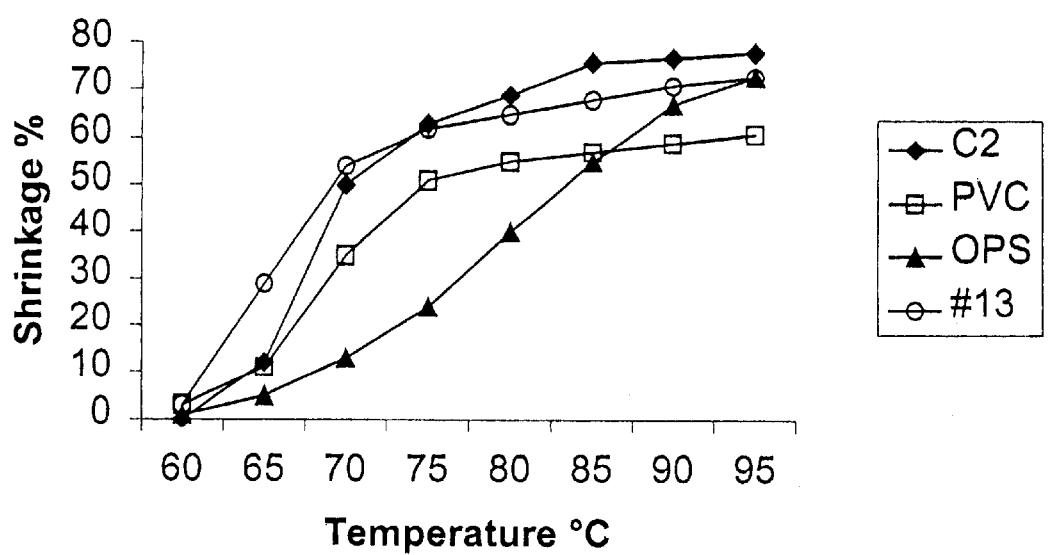
FIG. 4 is a comparison plot of temperature vs. percent shrink after 30 seconds for commercial PVC, oriented polystyrene and a compositional blend in accordance with the present invention.

EXAMPLE 5 in addition to sample stretching using a T. M. Long film stretcher (4×1 stretch ratio) for Examples 3 and 4 above, samples C2 and #13 were also stretched to a 5×1 stretch ratio using a standard tenter frame. This higher stretch ratio provides a much higher theoretical ultimate shrinkage. The 30 second shrinkage curves are shown in FIG. 4 along with shrink curves for commercial PVC and oriented polystyrene (oPS). Sample C2 has a slightly higher ultimate shrinkage than #13 (78% vs. 73%), however, the onset shrink temperature for #13 is about 5° C. lower producing a flatter, more controllable shrink curve. The onset temperature of #13 also more closely matches that of PVC, and oPS, both of which are known for their excellent low temperature shrinkage properties. In contrast, both polyesters have higher ultimate shrinkages than either PVC or oPS making them better suited for containers having more pronounced curvature. By maintaining a high ultimate shrinkage and lowering the onset temperature, a more versatile shrink polymer is obtained.

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents. Moreover, all patents, patent applications, publications, and literature references presented herein are incorporated by reference in their entirety for any disclosure pertinent to the practice of this invention.

We claim:

1. A compositional blend of a polyester and a copolyester comprising:
   (A) from about 50 to about 99 weight percent a polyester comprising:
      (1) an acid residue moiety comprising from about 60 to 100 mole percent terephthalic acid and from 0 to about 40 mole percent of a second acid selected from the group consisting of isophthalic acid, adipic acid, azelaic acid, naphthalenedicarboxylic acid, succinic acid, cyclohexanedicarboxylic acid; and mixtures thereof; and
      (2) a diol residue moiety comprising from about:
         i. 0–20 mole percent diethylene glycol;
         ii. 10–35 mole percent 1,4-cyclohexanedimethanol;
         iii. 0–25 mole percent neopentyl glycol;
         iv. 0–30 mole percent propanediol;
         v. 0–30 mole percent 1,4-butanediol; and
         vi. remaining mole percent is ethylene glycol; and
   (B) from about 1 to about 50 weight percent of an essentially, linear, random copolyester or branched and/or chain extended copolyester thereof and having an inherent viscosity of about 0.2 to about 2.0 deciliters/gram as measured at a temperature of 25° C. for a 0.5 g sample in 100 ml of a 60/40 parts by weight solution of phenol/tetrachloroethane and having repeating units of:

$$-\!\!\left[\mathrm{O(R^1)\!-\!O\!-\!\overset{O}{\overset{\|}{C}}\!-\!(R^2)\!-\!\overset{O}{\overset{\|}{C}}}\right]_{ran}\!\!\text{and}$$

$$-\!\!\left[\mathrm{O(R^3)\!-\!O\!-\!\overset{O}{\overset{\|}{C}}\!-\!(R^4)\!-\!\overset{O}{\overset{\|}{C}}}\right]_{ran}$$

wherein
$R^1$ is selected from one or more of the groups consisting of $C_2$–$C_8$ alkylene or oxylalkylene, and the mole percent of $R^1$ is from about 80 to 100;
$R^3$ is selected from one or more of the groups consisting of $C_2$–$C_8$ alkylene or oxylalkylene; $C_2$–$C_8$ alkylene or oxylalkylene substituted with one to four substituents independently selected from the group consisting of halo, $C_6$–$C_{10}$ aryl, and $C_1$–$C_4$ alkoxy; $C_5$–$C_{12}$ cycloalkylene; $C_5$–$C_{12}$ cycloalkylene substituted with one to four substituents independently selected from the group consisting of halo, $C_6$–$C_{10}$ aryl, and $C_1$–$C_4$ alkoxy; and the mole percent of $R^3$ is from 0 to about 20;
$R^2$ is selected from one or more of the groups consisting of $C_2$–$C_{12}$ alkylene or oxylalkylene; $C_2$–$C_{12}$ alkylene or oxylalkylene substituted with one to four substituents independently selected from the group consisting of halo, $C_6$–$C_{10}$ aryl, and $C_1$–$C_4$ alkoxy; $C_5$–$C_{10}$ cycloalkylene; $C_5$–$C_{10}$ cycloalkylene substituted with one to four substituents independently selected from the group consisting of halo, $C_6$–$C_{10}$ aryl, and $C_1$–$C_4$ alkoxy; and the mole percent of $R^2$ is from about 35 to about 95;
$R^4$ is selected from one or more of the groups consisting of $C_6$–$C_{10}$ aryl; $C_6$–$C_{10}$ aryl substituted with one to four substituents independently selected from the group consisting of halo, $C_6$–$C_{10}$ aryl, and $C_1$–$C_4$ alkoxy; $C_5$–$C_{10}$ cycloalkylene; $C_5$–$C_{10}$ cycloalkylene substituted with one to four substituents independently selected from the group consisting of halo, $C_6$–$C_{10}$ aryl, and $C_1$–$C_4$ alkoxy; and the mole percent of $R^4$ is from about 5 to about 65;
wherein the weight percentages are based on the total weight of components (A) and (B); the mole percentages of component (A) are based on 100 mole percent of the acid residue moiety and 100 mole percent of the diol residue moiety; and for component (B) the sum of the mole percent for $R^1$ and $R^3$ is 100 and the sum of the mole percent for $R^2$ and $R^4$ is 100.

2. The compositional blend of claim 1 wherein the acid residue moiety of component (A) comprises from 0 to about 20 mole percent of an acid selected from the group consisting of isophthalic, adipic, azelaic, naphthalenedicarboxylic, and succinic and from about 80 to 100 mole percent terephthalic acid.

3. The compositional blend of claim 1 wherein the acid residue moiety of component (A) comprises from 0 to about 30 mole percent of cyclohexanedicarboxylic acid and from about 70 to 100 mole percent terephthalic acid.

4. The compositional blend of claim 1 wherein the acid residue moiety of component (A) comprises from 0 to about 10 mole percent of an acid selected from the group consisting of isophthalic, adipic, azelaic, naphthalenedicarboxylic, succinic, and cyclohexanedicarboxylic and from about 90 to 100 mol percent terephthalic acid.

5. The compositional blend of claim 1 wherein the diol residue moiety of component (A) comprises from about:
   i. 7–12 mole percent diethylene glycol;
   ii. 17–28 mole percent 1,4-cyclohexanedimethanol;
   iii. 0–2 mole percent neopentyl glycol;
   iv. 0–2 mole percent propanediol;
   v. 0–2 mole percent 1,4-butanediol; and
   vi. remaining mole percent is ethylene glycol.

6. The compositional blend of claim 1 wherein the diol residue moiety of component (A) comprise from about 10 to about 28 mole percent 1,4-cyclohexanedimethanol, from about 7 to about 12 mole percent diethylene glycol and the remaining mole percent is ethylene glycol.

7. The compositional blend of claim 1 wherein component (B), $R^1$ of is selected from $C_2$–$C_8$ alkylene and is present from about 90 to 100 mole percent; $R^3$ is present in an amount of from 0 to about 10 mole percent; $R^2$ is selected from one or more groups consisting of $C_2$–$C_8$ alkylene or oxyalkylene and is present in an amount from about 35 to about 95 mole percent; and $R^4$ is selected from one or more of the groups consisting of $C_6$–$C_{10}$ aryl and is present in an amount of from about 5 to about 65 mole percent.

8. The compositional blend of claim 1 wherein component (B), $R^1$ is selected from $C_2$–$C_4$ alklyene and is present from about 95 to 100 mole percent; $R^3$ is present from 0 to about 5 mole percent; $R^2$ is selected from one or more of the groups consisting of $C_2$–$C_6$ alkylene or $C_2$ oxyalkylene and is present from about 35 to about 65 mole percent; $R^4$ is 1,4-disubstituted-$C_6$ aryl and is present from about 35 to about 65 mole percent.

9. The compositional blend of claim 1 wherein the copolyester of component (B) comprises an acid residue moiety and a diol residue moiety, wherein the acid residue moiety comprises:

from about 30 to about 75 mole percent of an aliphatic acid selected from the group consisting of adipic, glutaric, succinic, azelaic and mixtures thereof and from about 25 to about 70 mole percent of an aromatic acid selected from the group consisting of terephthalic, isophthalic, naphthalene dicarboxylic and mixtures thereof;

and wherein the diol residue moiety comprises:

from about 70 to 100 mole percent of a primary diol selected from the group consisting of 1,4-butanediol, hexanediol and mixtures thereof and from 0 to about 30 mole percent of a modifying diol selected from the group consisting of ethylene glycol, diethylene glycol, propanediol, neopentyl glycol, 1,4-cyclohexanedimethanol and mixtures thereof.

10. The compositional blend of claim 9 wherein the copolyester of component (B) comprises the acid residue moiety of from about 40 to about 60 mole percent of the aliphatic acid and from about 40 to 60 mole percent of the aromatic acid and the diol residue moiety of from about 90 to 100 mole percent of the primary diol and from 0 to about 10 mole percent of the modifying diol.

11. The compositional blend of claim 9 wherein the copolyester of component (B) comprises the acid residue moiety of from about 55 to about 60 mole percent of the aliphatic acid and from about 40 to 45 mole percent of the aromatic acid and the diol residue moiety of from about 95 to 100 mole percent of the primary diol and from 0 to about 5 mole percent of the modifying diol.

12. The compositional blend of claim 11 wherein the aliphatic acid is adipic acid, the aromatic acid is terephthalic acid, the primary diol is 1,4-butanediol.

13. A heat shrinkable film comprising a compositional blend of a polyester and a copolyester comprising:

(A) from about 50 to about 99 weight percent a polyester comprising:

(1) one or more acid residue moiety comprising from about 60 to 100 mole percent terephthalic acid and from 0 to about 40 mole percent of a second acid selected from the group consisting of isophthalic acid, adipic acid, azelaic acid, naphthalenedicarboxylic acid, succinic acid, cyclohexanedicarboxylic acid; and mixtures thereof; and (2) one or more diol residue moiety comprising from about:

i. 0–20 mole percent diethylene glycol;
ii. 10–35 mole percent 1,4-cyclohexanedimethanol;
iii. 0–25 mole percent neopentyl glycol;
iv. 0–30 mole percent propanediol;
v. 0–30 mole percent 1,4-butanediol; and
vi. remaining mole percent is ethylene glycol; and (B) from about 1 to about 50 weight percent of an essentially, linear, random copolyester or branched and/or chain extended copolyester thereof and having an inherent viscosity of about 0.2 to about 2.0 deciliters/gram as measured at a temperature of 25° C. for a 0.5 g sample in 100 ml of a 60/40 parts by weight solution of phenol/tetrachloroethane and having repeating units of:

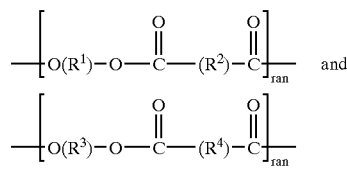

wherein
$R^1$ is selected from one or more of the groups consisting of $C_2$–$C_8$ alkylene or oxylalkylene, and the mole percent of $R^1$ is from about 80 to 100;
$R^3$ is selected from one or more of the groups consisting of $C_2$–$C_8$ alkylene or oxylalkylene; $C_2$–$C_8$ alkylene or oxylalkylene substituted with one to four substituents independently selected from the group consisting of halo, $C_6$–$C_{10}$ aryl, and $C_1$–$C_4$ alkoxy; $C_5$–$C_{12}$ cycloalkylene; $C_5$–$C_{12}$ cycloalkylene substituted with one to four substituents independently selected from the group consisting of halo, $C_6$–$C_{10}$ aryl, and $C_1$–$C_4$ alkoxy; and the mole percent of $R^3$ is from 0 to about 20;
$R^2$ is selected from one or more of the groups consisting of $C_2$–$C_{12}$ alkylene or oxyalkylene; $C_2$–$C_{12}$ alkylene or oxylalkylene substituted with one to four substituents independently selected from the group consisting of halo, $C_6$–$C_{10}$ aryl, and $C_1$–$C_4$ alkoxy; $C_5$–$C_{10}$ cycloalkylene; $C_5$–$C_{10}$ cycloalkylene substituted with one to four substituents independently selected from the group consisting of halo, $C_6$–$C_{10}$ aryl, and $C_1$–$C_4$ alkoxy; and the mole percent of $R^2$ is from about 35 to about 95;
$R^4$ is selected from one or more of the groups consisting of $C_6$–$C_{10}$ aryl; $C_6$–$C_{10}$ aryl substituted with one to four substituents independently selected from the group consisting of halo, $C_6$–$C_{10}$ aryl, and $C_1$–$C_4$ alkoxy; $C_5$–$C_{10}$ cycloalkylene; $C_5$–$C_1$ cycloalkylene substituted with one to four substituents independently selected from the group consisting of halo, $C_6$–$C_{10}$ aryl, and $C_1$–$C_4$ alkoxy; and the mole percent of $R^4$ is from about 5 to about 65;

wherein the weight percentages are based on the total weight of components (A) and (B); the mole percentages of component (A) are based on 100 mole percent of the acid residue moiety and 100 mole percent of the diol residue moiety; and for component (B) the sum of the mole percent for $R^1$ and $R^3$ is 100 and the sum of the mole percent for $R^2$ and $R^4$ is 100.

14. The heat shrinkable film of claim 13 wherein the acid residue moiety of component (A) comprises from 0 to about 20 mole percent of an acid selected from the group consisting of isophthalic, adipic, azelaic, naphthalenedicarboxylic, and succinic and from about 80 to 100 mole percent terephthalic acid.

15. The heat shrinkable film of claim 13 wherein the acid residue moiety of component (A) comprises from 0 to about 30 mole percent of cyclohexanedicarboxylic acid and from about 70 to 100 mole percent terephthalic acid.

16. The heat shrinkable film of claim 13 wherein the acid residue moiety of component A) comprises from 0 to about 10 mole percent of an acid selected from the group consisting of isophthalic, adipic, azelaic, naphthalenedicarboxylic, succinic, and cyclohexanedicarboxylic and from about 90 to 100 mol percent terephthalic acid.

17. The heat shrinkable film of claim 13 wherein the diol residue moiety of component (A) comprises from about:

i. 7–12 mole percent diethylene glycol;

ii. 17–28 mole percent 1,4-cyclohexanedimethanol;

iii. 0–2 mole percent neopentyl glycol;

iv. 0–2 mole percent propanediol;

v. 0–2 mole percent 1,4-butanediol; and vi. remaining mole percent is ethylene glycol.

18. The heat shrinkable film of claim 13 wherein the diol residue moiety of component (A) comprise from about 10 to about 28 mole percent 1,4-cyclohexanedimethanol, from about 7 to about 12 mole percent diethylene glycol and the remaining mole percent is ethylene glycol.

19. The heat shrinkable film of claim 13 wherein component (B), $R^1$ of is selected from $C_2$–$C_8$ alkylene and is present from about 90 to 100 mole percent; $R^3$ is present in an amount of from 0 to about 10 mole percent; $R^2$ is selected from one or more groups consisting of $C_2$–$C_8$ alkylene or oxyalkylene and is present in an amount from about 35 to about 95 mole percent; and $R^4$ is selected from one or more of the groups consisting of $C_6$–$C_{10}$ aryl and is present in an amount of from about 5 to about 65 mole percent.

20. The heat shrinkable film of claim 13 wherein component (B), $R^1$ is selected from $C_2$–$C_4$ alklyene and is present from about 95 to 100 mole percent; $R^3$ is present from 0 to about 5 mole percent; $R^2$ is selected from one or more of the groups consisting of $C_2$–$C_6$ alkylene or $C_2$ oxyalkylene and is present from about 35 to about 65 mole percent; $R^4$ is 1,4-disubstituted-$C_6$ aryl and is present from about 35 to about 65 mole percent.

21. The heat shrinkable film of claim 13 wherein the copolyester of component (B) comprises an acid residue moiety and a diol residue moiety, wherein the acid residue moiety comprises:

from about 30 to about 75 mole percent of an aliphatic acid selected from the group consisting of adipic, glutaric, succinic, azelaic and mixtures thereof and from about 25 to about 70 mole percent of an aromatic acid selected from the group consisting of terephthalic, isophthalic, naphthalene dicarboxylic and mixtures thereof;

and wherein the diol residue moiety comprises:

from about 70 to 100 mole percent of a primary diol selected from the group consisting of 1,4-butanediol, hexanediol and mixtures thereof and from 0 to about 30 mole percent of a modifying diol selected from the group consisting of ethylene glycol, diethylene glycol, propanediol, neopentyl glycol, 1,4-cyclohexanedimethanol and mixtures thereof.

22. The heat shrinkable film of claim 21 wherein the copolyester of component (B) comprises the acid residue moiety of from about 40 to about 60 mole percent of the aliphatic acid and from about 40 to 60 mole percent of the aromatic acid and the diol residue moiety of from about 90 to 100 mole percent of the primary diol and from 0 to about 10 mole percent of the modifying diol.

23. The heat shrinkable film of claim 21 wherein the copolyester of component (B) comprises the acid residue moiety of from about 55 to about 60 mole percent of the aliphatic acid and from about 40 to 45 mole percent of the aromatic acid and the diol residue moiety of from about 95 to 100 mole percent of the primary diol and from 0 to about 5 mole percent of the modifying diol.

24. The heat shrinkable film of claim 23 wherein the aliphatic acid is adipic acid, the aromatic acid is terephthalic acid, the primary diol is 1,4-butanediol.

* * * * *

UNITED STATES PATENT AND TRADEMARK OFFICE
CERTIFICATE OF CORRECTION

PATENT NO. : 6,599,994 B2
DATED : July 29, 2003
INVENTOR(S) : Shelby et al.

It is certified that error appears in the above-identified patent and that said Letters Patent is hereby corrected as shown below:

<u>Column 18,</u>
Line 37, reads "alkoxy; $C_5$-$C_{10}$ cycloalkylene; $C_5$-$C_1$ cycloalkylene"
and should read -- alkoxy; $C_5$-$C_{10}$ cycloalkylene; $C_5$-$C_{10}$ cycloalkylene --

Signed and Sealed this

Ninth Day of December, 2003

JAMES E. ROGAN
*Director of the United States Patent and Trademark Office*